(12) United States Patent
Goto et al.

(10) Patent No.: US 7,937,407 B2
(45) Date of Patent: May 3, 2011

(54) ACCESS CONTROL METHOD, ACCESS CONTROL SYSTEM, METADATA CONTROLLING DEVICE, AND TRANSMITTING APPARATUS

(75) Inventors: Jun Goto, Tokyo (JP); Yusei Nishimoto, Tokyo (JP); Akitsugu Baba, Tokyo (JP); Haruyuki Nakamura, Tokyo (JP); Kiyohiko Ishikawa, Tokyo (JP); Tatsuya Kurioka, Tokyo (JP)

(73) Assignees: NEC Corporation, Tokyo (JP); Nippon Hoso Kyokai, Shibuya-Ku, Tokyo (JP)

( * ) Notice: Subject to any disclaimer, the term of this patent is extended or adjusted under 35 U.S.C. 154(b) by 202 days.

(21) Appl. No.: 10/591,619

(22) PCT Filed: Mar. 4, 2005

(86) PCT No.: PCT/JP2005/004275
§ 371 (c)(1),
(2), (4) Date: Feb. 26, 2007

(87) PCT Pub. No.: WO2005/086006
PCT Pub. Date: Sep. 15, 2005

(65) Prior Publication Data
US 2007/0277245 A1    Nov. 29, 2007

(30) Foreign Application Priority Data

Mar. 4, 2004    (JP) .................................. 2004-060085
Dec. 10, 2004   (JP) .................................. 2004-358517

(51) Int. Cl.
*G06F 7/00* (2006.01)
(52) U.S. Cl. ...................................................... 707/783
(58) Field of Classification Search ................... 707/1, 2, 707/3, 783
See application file for complete search history.

(56) References Cited

U.S. PATENT DOCUMENTS

| 2002/0055942 A1* | 5/2002 | Reynolds | 707/200 |
| 2003/0079133 A1* | 4/2003 | Breiter et al. | 713/182 |
| 2003/0185395 A1* | 10/2003 | Lee et al. | 380/277 |
| 2004/0039916 A1* | 2/2004 | Aldis et al. | 713/177 |

(Continued)

FOREIGN PATENT DOCUMENTS

EP    1 309 198 A2    5/2003

(Continued)

OTHER PUBLICATIONS

"'Kattena Henshu wa Yurusanai' Sava Gata Hoso ga Gutaika", Nikkei Electronics, Nikkei Business Publications, Inc., Jun. 7, 2004, No. 875, p. 31.

(Continued)

*Primary Examiner* — Charles Rones
*Assistant Examiner* — Fazlul Quader
(74) *Attorney, Agent, or Firm* — Scully, Scott, Murphy & Presser, P.C.

(57) ABSTRACT

The present invention provides an access control method of controlling acceptance or rejection of access to content from metadata. The access control method according to the present invention includes a step of producing metadata 3A for content 6A and embedding a digital signature 4A of a producer who has produced the metadata as producer information in the produced metadata 3A, a step of embedding an identifier 5A indicating which metadata are accessible to the content in license information required to play back the content 6A, and an access propriety control step of comparing the digital signature 4A with the identifier 5A to control propriety of access to the content 6A from the produced metadata 3A.

24 Claims, 10 Drawing Sheets

U.S. PATENT DOCUMENTS

2005/0125411 A1* 6/2005 Kilian et al. .................. 707/10
2005/0268102 A1* 12/2005 Downey ..................... 713/176

FOREIGN PATENT DOCUMENTS

| JP | 2002-57662 | 2/2002 |
| JP | 2002-63147 | 2/2002 |
| JP | 2003-51816 | 2/2003 |
| JP | 2003-204308 | 7/2003 |
| JP | 2004-320149 | 11/2004 |
| JP | 2005-167987 | 6/2005 |
| JP | 2005-176312 | 6/2005 |
| WO | 01/52178 A1 | 7/2001 |

OTHER PUBLICATIONS

Hunt, R., "Technological Infrastructure for PKI and Digital Certification" *Computer Communications* (2001) pp. 1460-1471, vol. 24.

* cited by examiner

3A SIGNED METADATA IN XML FORMAT

```xml
<?xml version="1.0" encoding="UTF-8"?>
<TVAMain xmlns="http://www.tv-anytime.org/2001/08/Metadata"
        xmlns:mpeg7="urn:mpeg:mpeg7:schema:2001
        xmlns:ds=http://www.w3.org/2000/09/xmldsig#
publisher="METAID://nhk.co.jp.test1">
  <ProgramDescription>
    ...
    ...
    <SegmentInformationTable>
      <SegmentList>
        <SegmentInformation segmentId="S1" fragmentId="···">
        ...
        </SegmentInformation>
      </SegmentList>
      <SegmentGroupList>
        <SegmentGroupInformation groupId="G1" fragmentId="···">
        ...
        </SegmentGroupInformation>
      </SegmentGroupList>
    </SegmentInformationTable>
  </ProgramDescription>
```

13 PRODUCT PORTIONS OF PRODUCER 1

4A SIGNATURE OF PRODUCER 1

```xml
<ds:Signature id="first provider">
<signedInfo>
  <SignatureMethod Algorithm="···" />
  <Reference URI="">
    ...
  </Reference>
  ...
</signedInfo>
<SignatureValue>
zae83njkdg39khu ···
</SignatureValue>
<KeyInfo>
  <X509Data>
        <X509Certificate> fj8dubdb73ruz620dfuy8eghjfgye··· </X509Certificate>
  </X509Data>
</KeyInfo>
<ds:Signature>
```

5A PUBLIC KEY CERTIFICATE OF SIGNER

```xml
</TVAMain>
```

FIG. 3

3A' SIGNED METADATA IN XML FORMAT

```
<?xml version="1.0" encoding="UTF-8"?>
<TVAMain xmlns="http://www.tv-anytime.org/2001/08/Metadata"
     xmlns:mpeg7="urn:mpeg:mpeg7:schema:2001
     xmlns:ds=http://www.w3c.org/2000/09/xmldsig#
publisher="METAID://nhk.co.jp.test1">
  <ProgramDescription>
    ...
    ...
    <SegmentInformationTable>
      <SegmentList>
        <SegmentInformation segmentId="S1" fragmentId="···">   ──13
        ...                                                      PRODUCT
        </SegmentInformation>                                    PORTIONS
                                                                 OF
        <SegmentInformation segmentId="S2" fragmentId="···">     METADATA
        ...                                                      PRODUCER 1
        </SegmentInformation>
      </SegmentList>
      <SegmentGroupList>
        <SegmentGroupInformation groupId="G1" fragmentId="···">
        ...                                                     ──37
        </SegmentGroupInformation>                                PRODUCT
                                                                  PORTIONS
        <SegmentGroupInformation groupId="G2" fragmentId="···">   OF
        ...                                                       METADATA
        </SegmentGroupInformation>                                PRODUCER
      </SegmentGroupList>                                         34
    </SegmentInformationTable>
  </ProgramDescription>
                                                4A SIGNATURE OF
  <ds:Signature id="first provider">              METADATA
  ...                                             PRODUCER 1
  <ds:Signature>

<ds:Signature id="second provider">
  ...                                      ← 39 SIGNATURE OF
  <ds:Signature>                                METADATA
                                                PRODUCER 34
</TVAMain>
```

FIG. 5

| DESCRIPTOR NAME | ITEM | BYTE LENGTH | NOTES |
|---|---|---|---|
| METADATA ACCESS CONTROL DESCRIPTOR 1 | DESCRIPTOR TAG | 1 | |
| | DESCRIPTOR LENGTH | 1 | THE VALUE IS N X 10 WHEN THE NUMBER OF THE LISTED METADATA PRODUCER TYPES IS N |
| | METADATA PRODUCER TYPE | 10 | THE MAXIMUM NUMBER OF THE LISTED IS 10 |

| DESCRIPTOR NAME | ITEM | BYTE LENGTH | NOTES |
|---|---|---|---|
| METADATA ACCESS CONTROL DESCRIPTOR 2 | DESCRIPTOR TAG | 1 | |
| | DESCRIPTOR LENGTH | 1 | THE VALUE IS N X 10 WHEN THE NUMBER OF THE LISTED METADATA PRODUCER IDENTIFICATION IS N |
| | METADATA PRODUCER TYPE | 10 | THE MAXIMUM NUMBER OF THE LISTED IS 10 |

ACCESS CONTROL METHOD, ACCESS CONTROL SYSTEM, METADATA CONTROLLING DEVICE, AND TRANSMITTING APPARATUS

TECHNICAL FIELD

The present invention relates to a method of controlling access to content from metadata in digital broadcasting.

BACKGROUND ART

Broadcasting systems based on home servers achieves program viewing that is not restricted by airtime, with a provision of a program storage device and a communication connecting function in a receiving device. Further, a content provider provides program-related information, called metadata, to achieve various broadcast services such as highlight program viewing. For example, such services include a service to allow a viewer to see only hitting scenes of a hitter as a digest of a baseball broadcast program. This service is achieved by a content provider who produces metadata including a program name indicative of a baseball broadcast program and information indicative of starting time points of all hitting scenes of the hitter and provides the metadata to a viewer. From the viewpoint of producing attractive metadata inexpensively, it is considered that metadata are produced not only by a content provider, but also by a network provider, a third party, or a user.

Meanwhile, falsification of metadata or production of unauthorized metadata may cause program use against content provider's intention, such as allowing a program to be viewed without any commercials or connecting scenes in a plurality of programs so as to generate another program. Accordingly, in order to prevent rampancy of unauthorized metadata, falsification of metadata should be prevented, and a content provider should be able to specify metadata permitted to be used for each program.

A reference discloses an outline of the standard of ARIB (Association of Radio Industries and Businesses) STD-B38 (Coding, Transmission and Storage Specification for Broadcasting Systems Based on Home Servers) and particularly illustrates a concept of broadcasting systems based on home servers (Reference: Standard outline (broadcasting field), Number of Standard: ARIB STD-B38, Name of Standard: Coding, Transmission and Storage Specification for Broadcasting Systems Based on Home Servers, [online], Association of Radio Industries and Businesses, [searched on Jan. 29, 2004], the Internet <URL: http://www.arib.or.jp/tyosaken-kyu/kikaku_hoso/hoso_std-b038.html>).

The standard of ARIB STD-B38 defines a description method of metadata for a program in an XML (Extensible Markup Language) format. The standard of ARIB STD-B38 formulates the definitions not only for describing additional information on content in metadata and displaying the additional information on a playback terminal, but also for describing information for playback control such as a partial playback of content based on a description in metadata. With use of a playback device having a function of playing back content based on metadata, the content can partially be played back, or a digest of the content can be defined and played back without editing the content.

Here, since metadata are described by XML, anyone can readily generate metadata. Thus, anyone can readily generate a digest of content if the content is accessible. Accordingly, it has been necessary to provide an access control to content, for example, so that access is permitted from metadata produced by an author A but is not permitted from metadata produced by an author B.

DISCLOSURE OF INVENTION

An object of the present invention is to provide an access control method of controlling acceptance or rejection of access to content according to a producer of metadata in broadcasting systems based on home servers in which metadata and content are distributed so as to achieve a function of a playback control of the content by the metadata.

Another object of the present invention is to provide an access control system for performing the above access control method.

Still another object of the present invention is to provide a metadata controlling device for controlling propriety of access to content according to a producer of metadata.

Still another object of the present invention is to provide a transmitting apparatus for allowing a receiving apparatus to control propriety of access to content according to a producer of metadata.

According to the present invention, there is provided an access control method characterized by comprising:

a producer information embedding step of embedding producer information indicating a producer of metadata produced for content in the metadata;

a step of embedding an identifier indicating which metadata are accessible to the content in license information required to play back the content; and an access propriety control step of comparing the producer information with the identifier to control propriety of access to the content from the produced metadata.

Further, according to the present invention, there is provided an access control system characterized by comprising:

producer information embedding means for embedding producer information indicating a producer of metadata produced for content in the metadata;

identifier embedding means for embedding an identifier indicating which metadata are accessible to the content in license information required to play back the content; and access propriety control means for comparing the producer information with the identifier to control propriety of access to the content from the produced metadata.

Further, according to the present invention, there is provided a metadata controlling device used in a content receiving part having a function of receiving and playing back content and a function of receiving an identifier which indicates which metadata are accessible to the content and is embedded in license information required to play back the content, characterized by comprising:

a function of receiving metadata produced for the content and producer information which indicates a producer who has produced the metadata and is embedded in the produced metadata; and an access propriety controlling function of obtaining the identifier from the content receiving part and comparing the producer information in the metadata with the identifier to control propriety of access to the content in the content receiving part from the produced metadata.

Furthermore, according to the present invention, there is provided a transmitting apparatus having a content transmitting device for transmitting content to a receiving apparatus and a metadata transmitting device for transmitting metadata produced for the content to the receiving apparatus, characterized in that;

said metadata transmitting device has a function of transmitting the produced metadata to the receiving apparatus in a state such that producer information indicating a producer of the metadata is embedded in the produced metadata, said content transmitting device has a function of transmitting license information required to play back the content to the receiving apparatus in a state such that an identifier indicating which metadata are accessible to the content is embedded in the license information, and said transmitting apparatus is operable to allow the receiving apparatus to control propriety of access to the content from the produced metadata by comparison of the producer information received from said metadata transmitting device with the identifier received from said content transmitting device.

According to the present invention, it is possible to determine access propriety to content from metadata by comparing producer information (signature value) indicating a producer of the metadata with an identifier (metadata access control descriptor) embedded in license information required to play back the content.

BRIEF DESCRIPTION OF DRAWINGS

FIG. 3 is a diagram showing metadata with an author's signature in the metadata generating device of the access control system of FIG. 1;

FIG. 5 is a diagram showing signed metadata additionally edited in a metadata controlling device of the access control system of FIG. 4;

FIG. 10 is a diagram explanatory of metadata access control descriptors used in the access control system of FIG. 4.

Figure 1:
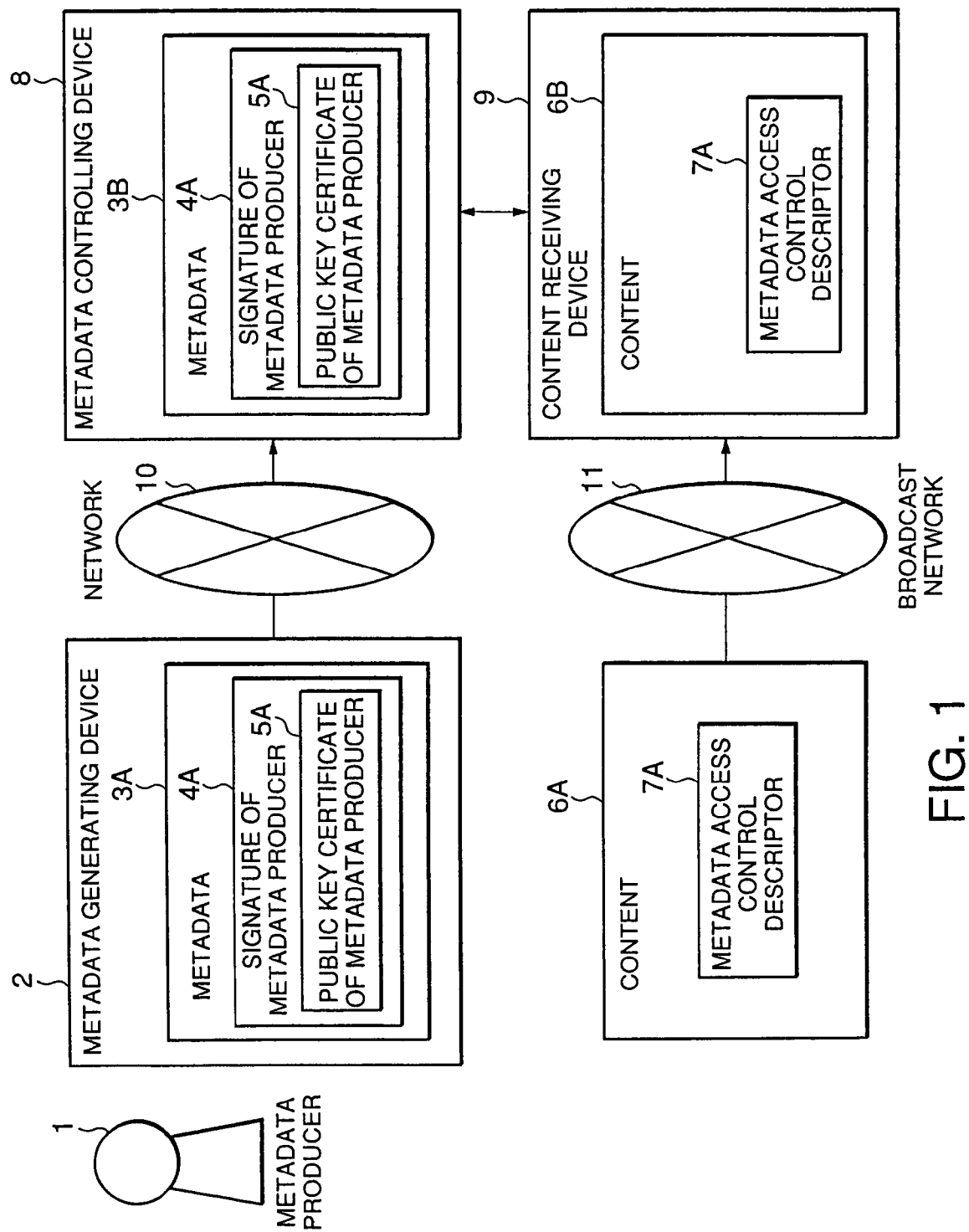
FIG. 1 is a block diagram of an access control system according to a first embodiment of the present invention.

| Description of reference numerals and signs: | |
|---|---|
| 1 | Metadata producer |
| 2 | Metadata generating device |
| 3A | Metadata |
| 3A' | Metadata |
| 4A | XML signature |
| 5A | Public key certificate |
| 6A | Content |
| 6A' | Content |
| 7A | Metadata access control descriptor |
| 8 | Metadata controlling device |
| 9 | Content receiving device |
| 10 | Network |
| 11 | Broadcasting network |
| 13 | Product portion of producer |
| 22 | Content generator |
| 25 | Network |
| 29 | Metadata controlling device |
| 30 | Content receiving and transmitting device |
| 34 | Metadata producer |

BEST MODE FOR CARRYING OUT THE INVENTION

In the following embodiment of the present invention, there is described an example in which producer information which is embedded in metadata and indicates a producer who has produced the metadata is a digital signature of the producer. However, the producer information is not limited to a digital signature and may be other information indicating a producer who has produced the metadata. Here, a producer who has produced metadata is a generator who has generated an instance (entity) itself of the metadata in the metadata or a producer who has added and edited the metadata.

Specifically, in the following embodiment, a digital signature (XML signature) of a generator who has generated an instance (entity) itself of metadata, which is defined by ARIB STD-B38, in the metadata (or a producer who has added and edited the metadata) is embedded as producer information in the metadata to identify the generator who has generated the metadata (or the producer who has added and edited the metadata). Meanwhile, an identifier for determining which metadata is accessible to content is embedded in the content. Propriety of access to the content from the produced metadata is controlled by comparing the digital signature (XML signature) and the identifier with each other.

Embodiments of the present invention will be described below with reference to the drawings.

FIG. 1 shows an access control system according to a first embodiment of the present invention. This access control system serves to control access to content from metadata.

This access control system has a metadata generating device 2 used for generating metadata 3A for content 6A, which has already been generated. That is, a metadata producer 1 having a metadata generating device 2 generates metadata 3A for content GA, which has already been generated, with the metadata generating device 2.

Here, a metadata access control descriptor 7A indicating which metadata are permitted to access the content 6A is embedded in the content 6A. Typically, the metadata access control descriptor 7A indicates a producer of metadata that are permitted to access the content 6A. This is one of the features of the present invention.

Figure 2:
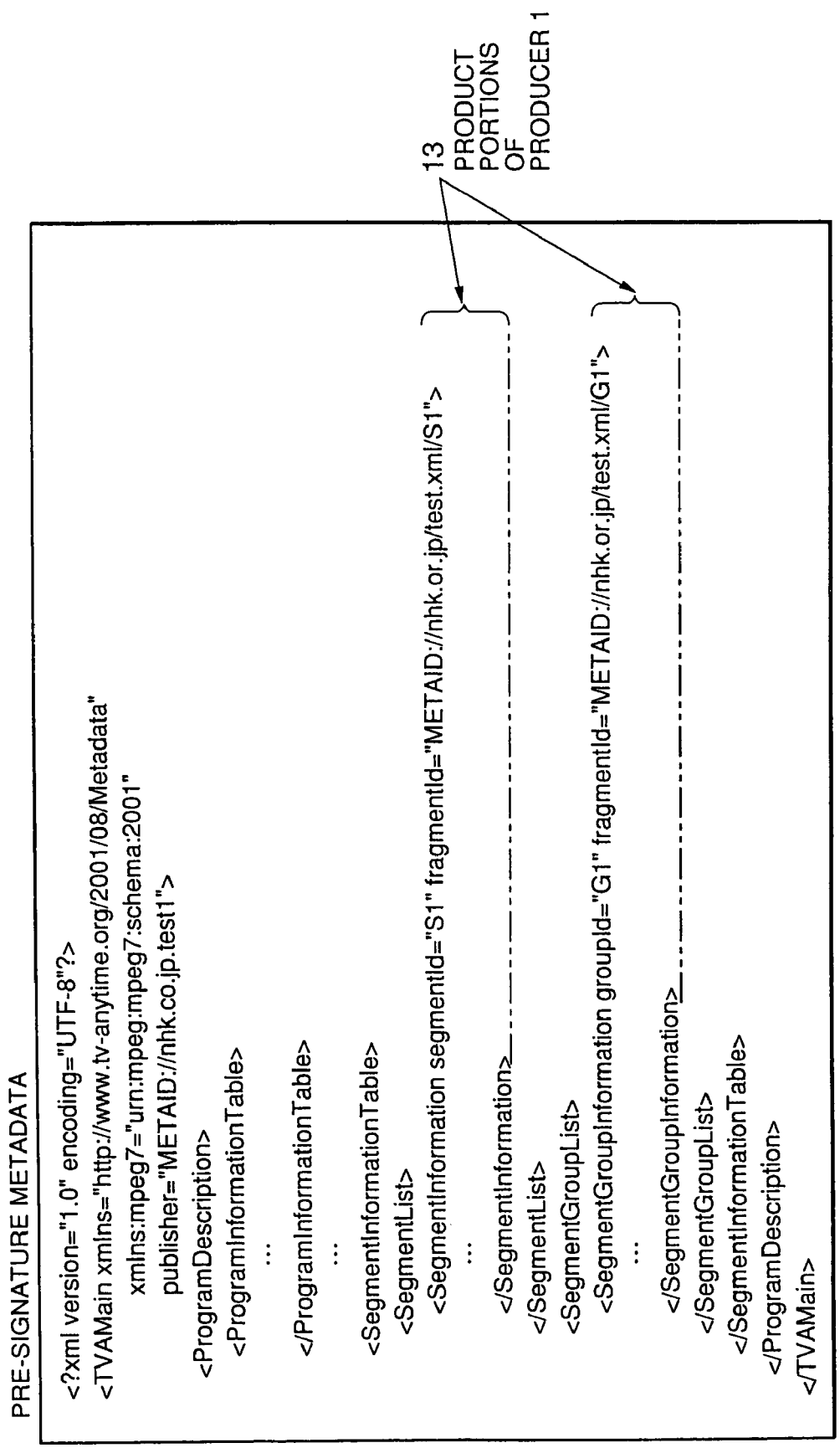
FIG. 2 is a diagram showing pre-signature metadata generated by a metadata producer 1 in a metadata generating device of the access control system of FIG. 1.

FIG. 2 shows metadata (pre-signature metadata) generated by the metadata producer 1. In the pre-signature metadata, for example, information indicating start time points of all hitting scenes of a hitter in the aforementioned baseball broadcast program is inserted as an instance of the metadata into one of product portions 13 of the producer.

Referring back to FIG. 1, the metadata producer 1 has a public key certificate to verify the producer and a secret key corresponding to the public key certificate. When generation of the metadata 3A is completed, the metadata producer 1 adds an XML signature 4A defined by XML-Signature and a public key certificate 5A used in the signature into the metadata 3A with the metadata generating device 2 so as to generate metadata with a producer signature.

FIG. 3 shows the aforementioned metadata 3A with the producer signature. The public key certificate 5A of the signer is embedded in the signature 4A of the producer 1, which is in an XML format, in a form in which binary data are base64-encoded.

Referring back to FIG. 1, the content 6A is distributed to a user via a broadcasting network 11, which serves as a communication means for broadcasting. The metadata 3A are distributed to the user via a network (telecommunication network such as the Internet) 10. The user has a metadata controlling device 8 connected to the network 10 for obtaining the metadata 3A distributed from the metadata generating device 2 as metadata 3B and a content receiving device 9 for obtaining the content 6A from the broadcasting network 11 as content 6B. The content receiving device 9 also has a content playback function. The user accesses the distributed metadata 3B (equivalent to 3A) with use of the metadata controlling device 8. If the metadata 3B is accessible to the content 6B (equivalent to 6A), the user can view an image digest of the content 6B or the like based on the metadata 3B.

The above example shows a method of distributing the content 6A via the broadcasting network 11 and distributing the metadata 3A via the network 10 to the user. However, the content 6A may be distributed via the network, and the metadata 3A may be distributed via the broadcasting network. Further, both of the content 6A and the metadata 3A may be distributed via the broadcasting network. Alternatively, both of the content 6A and the metadata 3A may be distributed via the network.

In this case, when the metadata controlling device 8 is to gain access to the content 6B from the metadata 3B, it verifies the signature 4A of the metadata producer, which has been provided to the metadata 6B, to confirm that the metadata 3B have not been falsified. Next, the metadata controlling device 8 obtains a value of a subject area at which information on an owner of a public key certificate is described in the public key certificate 5A of the metadata producer, and identifies the producer of the metadata 3A. Subsequently, the metadata controlling device 8 accesses the content receiving device 9 to obtain the metadata access control descriptor 7A in the content 6B. The metadata controlling device 8 compares the metadata access control descriptor 7A with the information on the owner of the public key certificate (the subject of the public key certificate defined by RFC3280) to determine whether the metadata is accessible to the content.

Specifically, when the information on the owner of the public key certificate (the subject of the public key certificate defined by RFC3280) is described in the metadata access control descriptor 7A as a producer of metadata that are permitted to access to the content, the metadata controlling device 8 is permitted to access the content 6B from the metadata 3B, so that an image digest of the content 6B or the like can be viewed based on the metadata 3B.

Here, when the metadata access control descriptor 7A describes that any metadata producer is accessible to the content, all metadata producers can view an image digest of the content 6B based on his/her metadata without restriction.

Further, when the information on the owner of the public key certificate (the subject of the public key certificate defined by RFC3280) is identified (or specified) as a producer of metadata who is described in the metadata access control descriptor 7A, the metadata controlling device 8 is also permitted to access the content 6B from the metadata 3B, so that an image digest of the content 6B or the like can be viewed based on the metadata 3B.

Any digital signature may be employed as long as it can specify a signer as a producer based on public key infrastructure (PKI) technology.

Figure 4:
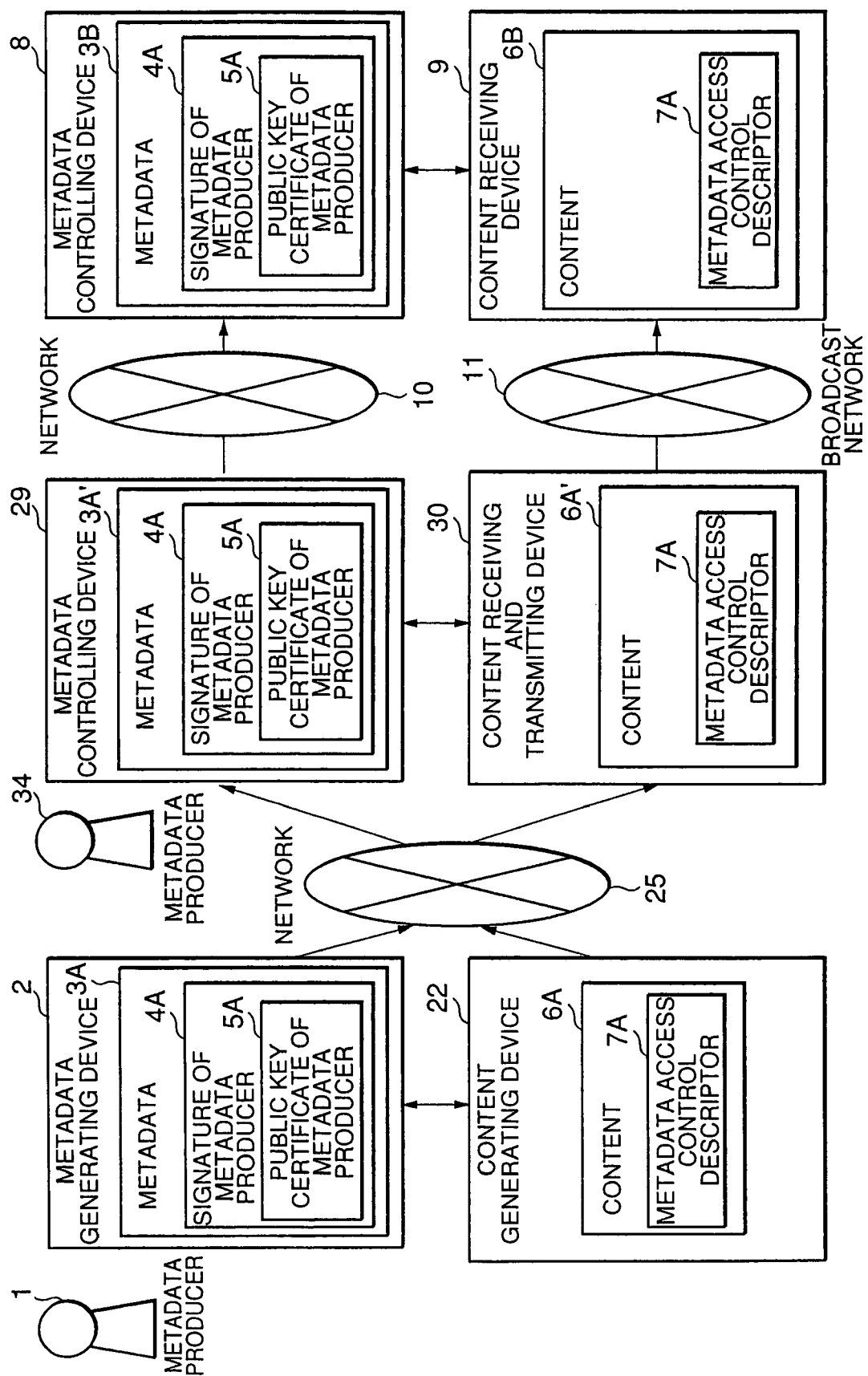
FIG. 4 is a block diagram of an access control system according to a second embodiment of the present invention.

FIG. 4 shows an access control system according to a second embodiment of the present invention. This access control system further includes a content generating device 22 for generating the aforementioned content 6A (FIG. 1), and a metadata controlling device 29 and a content receiving and transmitting device 30, which are connected between a metadata generating device 2 (FIG. 1) and a metadata controlling device 8 (FIG. 1) and between the content generating device 22 and a content receiving device 9 (FIG. 1). In the illustrated example, the metadata controlling device 29 and the content receiving and transmitting device 30 are connected to the metadata generating device 2 and the content generating device 22 via a network 25, and connected to the metadata controlling device 8 and the content receiving device 9 via a network 10 and a broadcasting network 11.

In this case, the same network as the network 10 may be used as the network 25. Alternatively, the network 10 and the broadcasting network 11 may be used for connections between the metadata generating device 2 and the metadata controlling device 29 and between the content generating device 22 and the content receiving and transmitting device 30 instead of the network 25.

In this access control system, the content receiving and transmitting device 30 has a function of the content receiving device 9 shown in FIG. 1, which obtains the content 6A from the network 25 as content 6A' (and also has a content playback function), and a function of a transmitting device to send the content 6A' via the broadcasting network 11. In succession to the content receiving and transmitting device 30, the content receiving device 9 obtains the content 6A' from the broadcasting network 11 as content 6B.

The metadata controlling device 29 obtains metadata 3A from the network 25 as metadata 3A'. The metadata controlling device 29 obtains metadata 3A from the network 25 as metadata 3A'. As with the metadata controlling device 8 described in FIG. 1, when a metadata producer 1 is described or identified (or specified) in a metadata access control descriptor 7A of the content 6A as a producer of metadata that are permitted to access to the content, the metadata controlling device 29 is permitted to access the content 6A' from the metadata 3A'. A user (metadata producer 34) of the metadata controlling device 29 and the content receiving and transmitting device 30 can view an image digest of the content 6A' or the like based on the metadata 3A'.

The metadata controlling device 29 also has a function of sending the metadata 3A' via the network 10. In succession to the metadata controlling device 29, the metadata controlling device 8 obtains the metadata 3A' from the network 10 as metadata 3B. As described in connection with FIG. 1, when the metadata producer 1 is described or identified (or specified) in the metadata access control descriptor 7A of the content 6B as a producer of metadata that are permitted to access the content, a user of the metadata controlling device 8 and the content receiving device 9 is also permitted to access the content 6B from the metadata 3B, so that the user can view an image digest of the content 6B or the like based on the metadata 3B.

In this access control system, it is assumed that the metadata producer 1 generates the metadata 3A for the content 6A with the metadata generating device 2, and that the metadata producer 34 additionally edits the metadata 3A into the metadata 3A' with the metadata controlling device 29.

FIG. 5 shows signed metadata 3A' in an XML format in a case where the metadata producer 34 additionally edits the metadata 3A with the metadata controlling device 29. In this case, product portions 13 (FIG. 2) of the metadata producer 1 and product portions 37 of the metadata producer 34 are mixed in the signed metadata 3A' in an XML format, which are produced by two of the metadata producer 1 and the metadata producer 34. The XML signatures of the metadata producer 1 and the metadata producer 34 are embedded in the metadata 3A' as a signature 4A (FIG. 2) of the metadata producer 1 and a signature 39 of the metadata producer 34.

In FIG. 4, however, when an owner (metadata producer 34) of a public key certificate in the signature 39 of the XML signature is not described or identified (or specified) in the metadata access control descriptor 7A of the content 6A' as a producer of metadata that are permitted to access to the content, the metadata controlling device 29 is not permitted to access the content 6A' from the metadata 3A'. Accordingly, an image digest of the content 6A' or the like cannot be viewed based on the metadata 3A'.

Thus, even if the metadata producer 34 adds metadata in the product portions 37 for access to the content 6A', which has been received by the content receiving and transmitting device 30, with the metadata controlling device 29, it is possible to achieve an access control to content from metadata such that the metadata is inactivated unless authorization was provided when the metadata access control descriptor 7A was generated by the content generating device 22.

Here, in FIG. 4, it is assumed that a receiving apparatus is formed by a combination of the metadata controlling device 29 and the content receiving and transmitting device 30 or by a combination of the metadata controlling device 8 and the content receiving device 9. Further, in FIG. 4, it is assumed that a transmitting apparatus has a content transmitting device (content generating device 22) for sending content to the receiving apparatus and a metadata transmitting device (metadata generating device 2) for sending metadata produced for the content to the receiving apparatus.

In this case, the metadata transmitting device (metadata generating device 2) has a function of sending the produced metadata to the receiving apparatus in a state such that a digital signature of a producer who has produced the metadata is embedded in the produced metadata. The content transmitting device (content generating device 22) has a function of sending license information required to play back the content to the receiving apparatus in a state such that an identifier indicating which metadata are permitted to access the content is embedded in the license information. Further, the transmitting apparatus is configured so that the receiving apparatus can control propriety of access to the content from the produced metadata by comparison of the digital signature received from the metadata transmitting device (metadata generating device 2) and the identifier received from the content transmitting device (content generating device 22).

Next, respective portions in the embodiment shown in FIG. 4 will be described in detail.

(The Metadata Generating Device 2)

Figure 6:
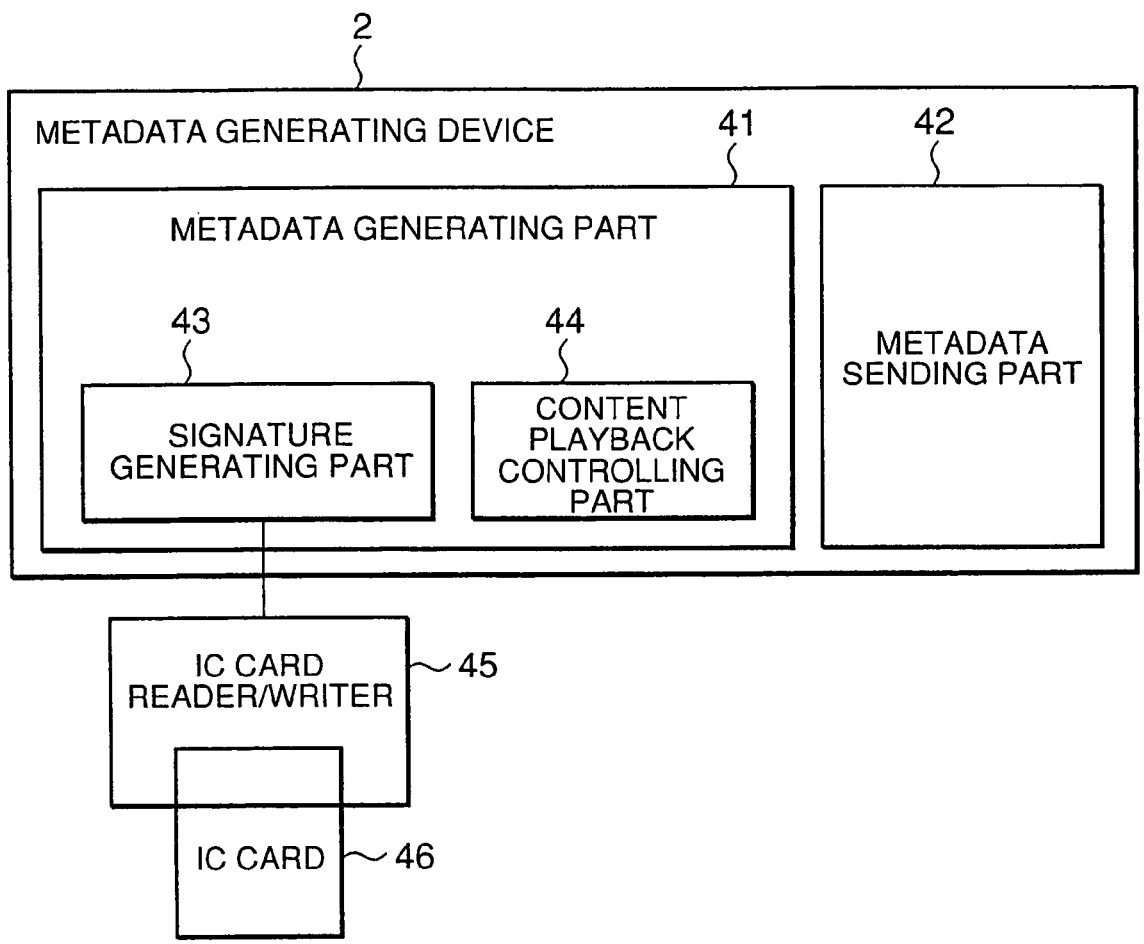
FIG. 6 is a block diagram of a metadata generating device in the access control system of FIG. 4.

Referring to FIG. 6, the metadata generating device 2 is formed of an information processing unit such as a personal computer to which an IC (Integrated Circuit) card reader/writer 45 is connected. The metadata generating device 2 is formed by a metadata generating part 41 and a metadata sending part 42, which are provided by software, for example. The metadata generating device 40 has a function of generating metadata 3A (FIG. 4) corresponding to content 6A (FIG. 4), a function of providing a digital signature to the generated metadata 3A, and a function to access an IC card 46, in which a public key certificate and a secret key used for a digital signature are stored. The IC card reader/writer 45 is connected to the metadata generating device.

The metadata generating part 41 has a function of generating metadata 3A corresponding to the content 6A, and is configured by software having a signature generating part 43 as a function of adding a digital signature to the generated content 6A. Further, the metadata generating part 41 has a content playback controlling part 44 for playing back the content 6A with use of the generated metadata 3A.

The metadata sending part 42 has a function of transferring the metadata 3A generated by the metadata generating part 41 to the metadata controlling device 29 (FIG. 4) via the telecommunication network 25 (FIG. 4) such as the Internet.

The signature generating part 43 has a function of providing a digital signature to the generated metadata 3A and executes a signature by generating a signature document in an XML-Signature format, which is a standard of W3C, from a document to be signed, generating a hash value for signature, generating a signature value with the IC card 46 via the IC card reader/writer 45, and embedding the generated signature value in the XML signature document. Further, the signature generating part 43 also has a function of embedding a public key certificate of a signer, which is stored in the IC card 46, in the document to be signed.

The IC card 46 can store a secret key and a public key certificate therein and has a function of making an encryption calculation therein. When a hash value of a document to be signed is received via the IC card reader/writer 45, the hash value is encrypted to generate a signature value, which is returned to the signature generating part 43 via the IC card reader/writer 45.

The IC card reader/writer 45 has a function of reading information in the IC card 46 in response to a command from an information processing unit such as a personal computer and a function of commanding the IC card 46 to make an encryption calculation for a digital signature using a key stored in the IC card 46.

The content playback controlling part 44 has a function of commanding the content generating device 22 (FIG. 4) to partially play back content according to the metadata 3A.

(The Metadata Controlling Device 29 (or 8))

Figure 7:
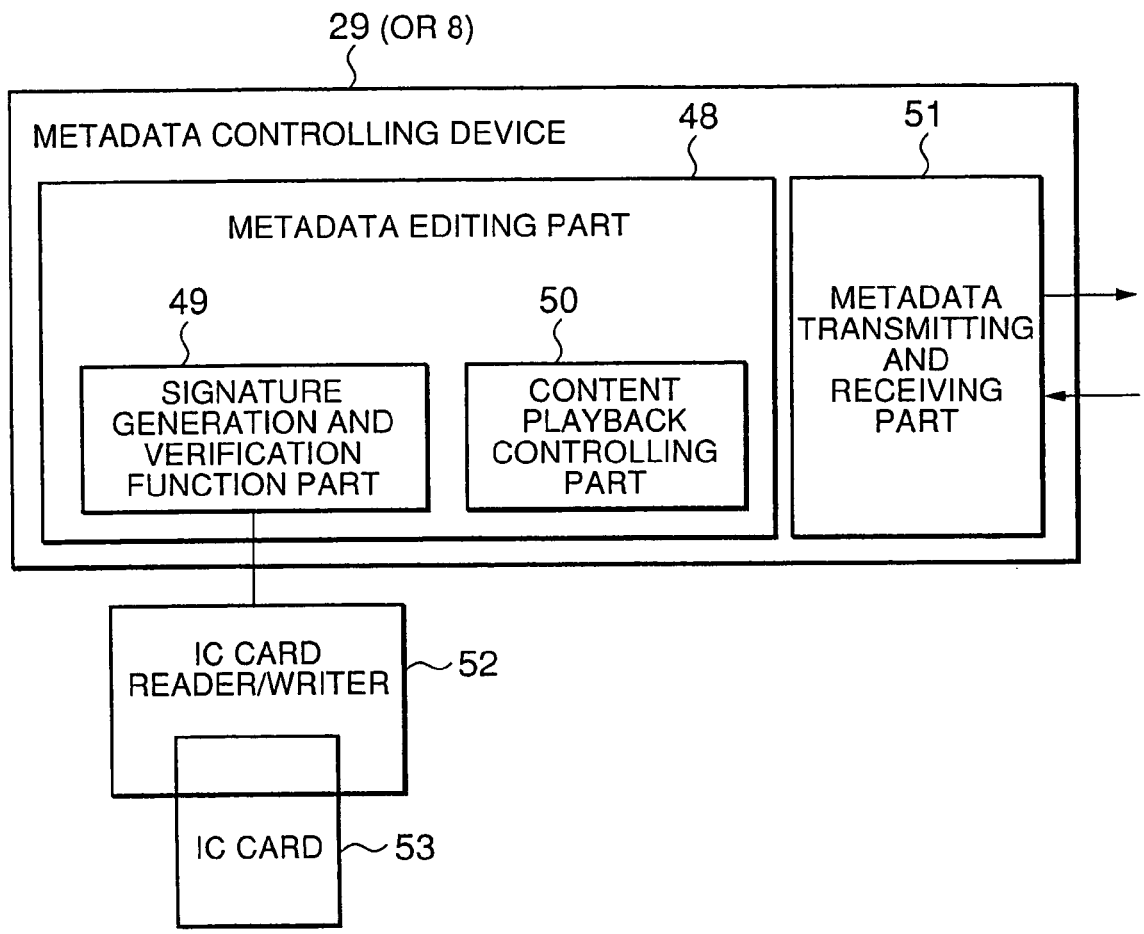
FIG. 7 is a block diagram of the metadata controlling device in the access control system of FIG. 4.

Referring to FIG. 7 together with FIG. 4, the metadata controlling device 47 is formed of an information processing unit such as a personal computer to which an IC card reader/writer 52 is connected. The metadata controlling device 47 is formed by a metadata editing part 48 including a signature generation and verification function part 49 and a content playback controlling part 50, and a metadata receiving and transmitting part 51, which are provided by a software program.

The IC card reader/writer 52 and an IC card 53 are the same as those connected to the metadata generating device 40.

The metadata editing part 48 has a function of editing metadata 3A' (or 3B), a function of providing a digital signature to the edited portion with use of the signature generation and verification function part 49, the IC card reader/writer 52, and the IC card 53, a function of verifying a signature and a certificate provided to the metadata 3A' (or 3B), and a content playback controlling part 50 for controlling playback of the content 6A' (or 6B).

The signature generation and verification function part 49 has a function of generating a signature as with the metadata generating device 2, a function of verifying a signature value of the provided metadata, and a function of verifying a certificate.

The content playback controlling part 50 has a function of commanding the content receiving and transmitting device 30 (or the content receiving device 9) to partially play back the content 6A' (or 6B) according to the metadata 3A' (or 3B). Further, the content playback controlling part 50 has a function of obtaining a metadata access control descriptor 7A, which is utilized to determine whether the metadata 3A' (or 3B) is accessible to the content 6A' (or 6B) at the time of playback, from the content 6A' (or 6B). The content playback controlling part 50 has a function of obtaining a public key certificate of a metadata producer from a metadata producer signature embedded in the metadata 3A' (or 3B) and identifying a signer from an owner of the public key certificate. The content playback controlling part 50 has a function of comparing the identified signer with the obtained metadata access control descriptor 7A to determine propriety of access to the content 6A' (or 6B).

(The Transmitting Device in the Content Generating Device 22)

Figure 8:
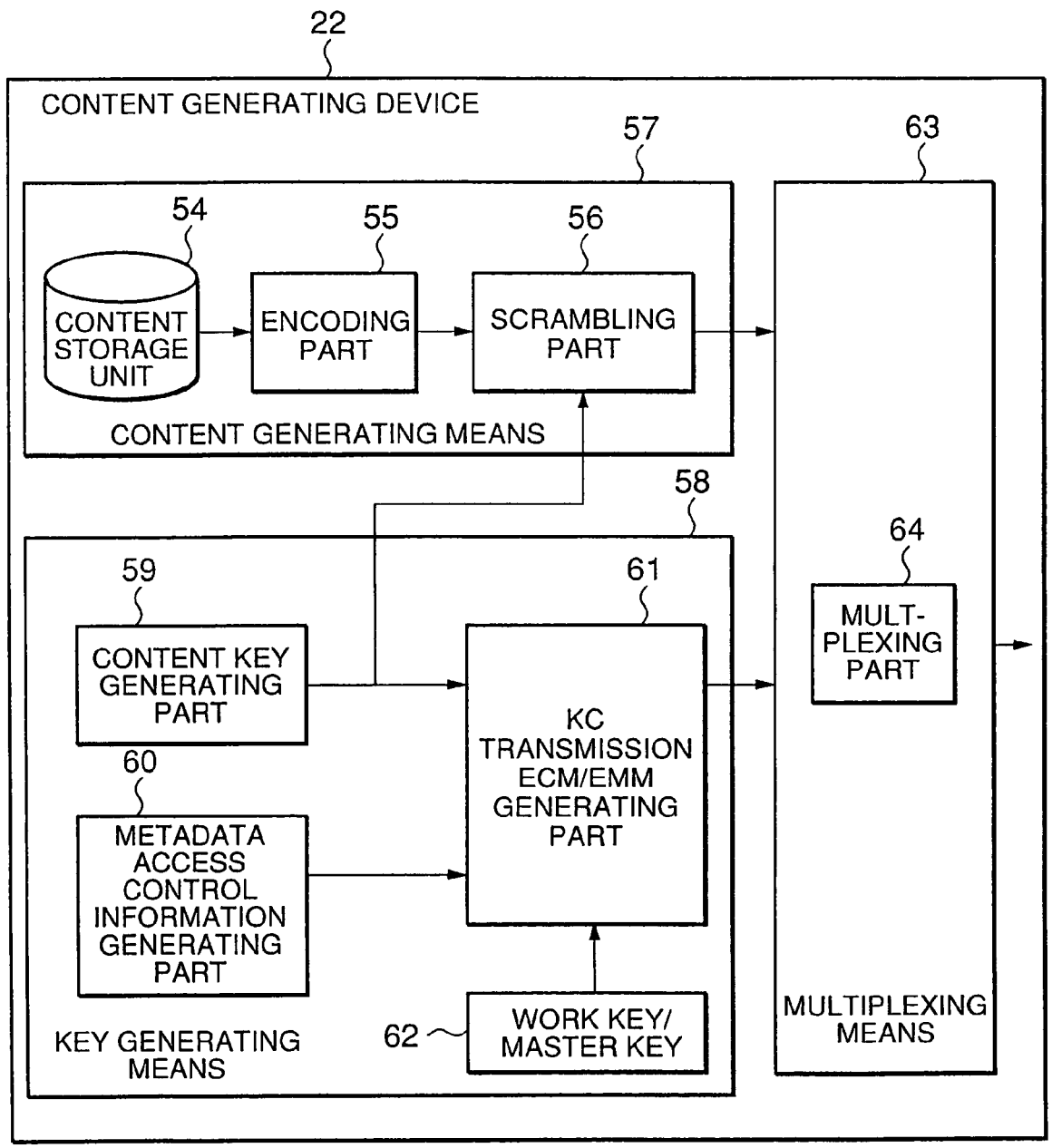
FIG. 8 is a block diagram of a transmitting device in a content generator of the access control system of FIG. 4.

Referring to FIG. 8 together with FIG. 4, the transmitting device in the content generating device 22 is formed by a content generating means 57 having a content storage unit 54 for storing content therein, an encoding part 55, and a scrambling part 56, a key generating means 58 having a content key generating part 59 for generating a content key Kc, a metadata access control information generating part 60, and a Kc transmission ECM/EMM generating part 61 for generating license information (Kc transmission ECM (Entitlement Control Message)/EMM (Entitlement Management Control Message)) required to play back content, and a multiplexing means 63 for multiplexing encrypted content generated by the content generating means 57 and a key generated by the key generating means 58.

The content storage unit 54 is formed by a storage device such as a hard disk for storing the content 6A of images, sounds, or data.

The encoding part 55 is formed by an encoding device for encoding images, sounds, or data in MPEG (Motion Picture Experts Group)-2 TS (Transport Stream).

The content key generating part 59 generates an encryption key (content key Kc) for encrypting content with a common key cryptography for each content, assigns a content identification for identifying the content, and manages the content key for each content identification.

The scrambling part 56 encrypts encoded content with the content key generated by the content key generating part 59 and generates encrypted content.

The metadata access control information generating part 60 generates a metadata access control descriptor 7A for permitting use of content 6A to metadata. The metadata access control descriptor 7A is formed by a metadata producer type indicative of a metadata producer identification, which is an identification code of a metadata producer, and an attribute of a metadata producer (such as a metadata producer who is also a content provider, a professional metadata producer, or a user).

The Kc transmission ECM/EMM generating part 61 generates a Kc transmission ECM or a Kc transmission EMM in a section format defined by ARIB-STDB25, "Access Control System for Digital Broadcasting," which includes a content key Kc, metadata access control information (metadata access control descriptor 7A), and a work key or a master key 62. Specifically, in the Kc transmission ECM/EMM generating part 61, license information required for the metadata access control information (metadata access control descriptor 7A) to play back content is embedded in a Kc transmission ECM or a Kc transmission EMM. The Kc transmission ECM performs an encryption with a work key 62, and the Kc transmission EMM performs an encryption with a master key 62. The master key 62 is an encryption key which is provided for each receiving device with a common key cryptography. The work key 62 is an encryption key which is provided for each unit such as a carrier with a common key cryptography, is also an encryption key common to receiving devices which are to receive a Kc transmission ECM, and is an encryption key to group respective receiving devices. That is, the Kc transmission ECM is used when Kc is broadcasted to receiving devices having a common work key. The Kc transmission EMM is used when Kc is distributed individually to respective receiving devices.

When a Kc transmission ECM/EMM (license information) is sent by broadcasting, a multiplexing part 64 of the multiplexing means 63 multiplexes and modulates the encrypted content of the content generating means 57 and the Kc transmission ECM/EMM encrypted with a work key, and sends them as broadcasting.

Here, when Kc is distributed individually to respective receiving devices, a Kc transmission EMM (license information) is individually distributed via a telecommunication network using TCP/IP (Transmission Control Protocol/Internet Protocol).

(The Transmitting Device in the Content Receiving and Transmitting Device 30)

The transmitting device in the content receiving and transmitting device 30 also has the same arrangement as the transmitting device in the content generating device 22 shown in FIG. 8. The content storage unit 54 in the content generating means 57 stores content (images, sounds, or data) received from the content generating device 22 by the receiving device in the content receiving and transmitting device 30.

(The Content Receiving Device 9)

Figure 9:
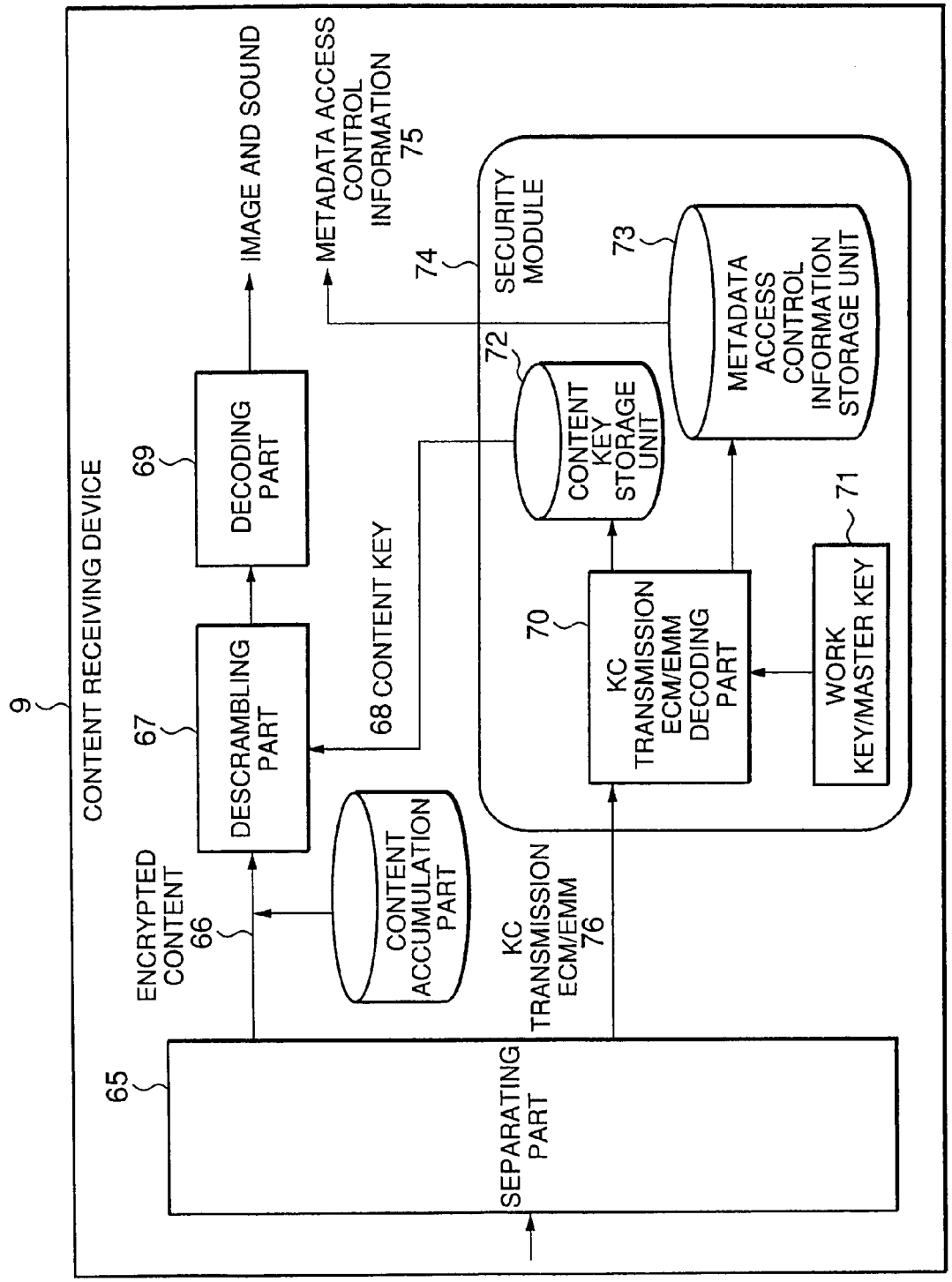
FIG. 9 is a block diagram of a content receiving device in the access control system of FIG. 4.

Referring to FIG. 9 together with FIG. 4, the content receiving device 9 is formed by a content decoding means having a descrambling part 67 and a decoding part 69, a security module 74 having a Kc transmission ECM/EMM decoding part 70, a content key storage unit 72, and a metadata access control information storage unit 73, and a separating means for separating encrypted content 66 and key information from each other.

The security module 74 is a tamper-proof module which prevents information from being falsely fetched from an exterior of the module and is formed by an IC card or the like. The security module 74 is strictly issued and managed by a trusted third party.

A separating part 65 demodulates the received broadcasting and separates it into encrypted content 66 and Kc transmission ECM/EMM 76 at an MPEG-2 TS level.

The Kc transmission ECM/EMM decoding part 70 decrypts and decodes the received Kc transmission ECM with a work key 71 and the received Kc transmission EMM with a master key 71, fetches a content key (Kc) 68 and metadata access control information (metadata access control descriptor 7A) 75, and stores them in the content key storage unit 72 and the metadata access control information storage unit 73. Thus, the content key (Kc) 68 and the metadata access control information (metadata access control descriptor 7A) 75 are stored safely in the security module 74.

At that time, the content key storage unit 72 stores the content key 68 for each content identification.

The metadata access control information storage unit 73 stores the metadata access control information (metadata access control descriptor 7A) 75 for each content identification.

The descrambling part 67 decrypts and decodes the encrypted content with the content key 68 obtained from the security module 74.

The decoding part 69 decodes the received content encoded in MPEG-2 TS and fetches audiovisual information or digital data as the content 6B.

(The Receiving Device in the Content Receiving and Transmitting Device 30)

The receiving device in the content receiving and transmitting device 30 also has the same arrangement as the content receiving device shown in FIG. 9 and receives content (images, sounds, or data) as content 6A' from the content generating device 22.

(Others)

In FIG. 4, the network 25 and the network 10 transmit metadata via a telecommunication network such as the Internet.

The broadcasting network 11 distributes content between image playback devices via an existing broadcasting network.

Next, operation in a case where the user of the metadata controlling device 8 and the content receiving device 9 also adds metadata in the embodiment shown in FIG. 4 will be described below.

In FIG. 4, content itself is produced in advance and stored in the content generating device 22. FIG. 8 is a detailed block diagram of the content generating device 22 shown in FIG. 4.

In FIG. 8, content 6A (FIG. 4) is stored in the content storage unit 54. The content generating device 22 encrypts content, generates an encryption key (content key Kc) for each content in order to transmit it to the content receiving device 9 (or the content transmitting and receiving device 30), assigns a content identification in order to identify the content, and manages a content key for each content identification.

The content is read from the content storage unit 54 and encoded in MPEG-2 TS (Transport Stream) by the encoding part 55. With use of the content key generated in the content key generating part 59, the encoded content is encrypted by the scrambling part 56 to generate encrypted content.

In order to achieve an access control to content from metadata, it is necessary to embed an access control parameter in content. Accordingly, the metadata access control information generating part 60 generates a metadata access control descriptor 7A as an access control parameter. The metadata access control descriptor 7A is formed by a metadata producer identification, which is an identification code of a metadata producer, and a metadata producer type indicating an attribute of the metadata producer (a metadata producer who is also a content provider, a professional metadata producer, a user, or the like).

Data structure of the metadata access control descriptor 1 describing a metadata producer type is shown in an upper table of FIG. 10. Metadata structure of the metadata access control descriptor 1 describing a metadata producer identification is shown in a lower table of FIG. 10.

In FIG. 8, the Kc transmission ECM/EMM generating part 61 encrypts the generated content identification, the content key, and the metadata access control information into a Kc transmission ECM or a Kc transmission EMM with a work key or master key 62 in a section format defined by ARIB-STDB25, "Access Control System for Digital Broadcasting." The master key 62 is an encryption key provided for each receiving device with a common key cryptography, and the work key 62 is an encryption key provided for each unit such as a carrier with a common key cryptography.

Meanwhile, the metadata producer 1 of FIG. 4 generates metadata 3A for content 6A with the metadata generating device 2. FIG. 6 is a detailed block diagram of the metadata generating device 1.

In FIG. 6, the metadata producer 1 generates metadata 3A for content 6A with the metadata generating part 41 of the metadata generating device 2. The generated metadata are a document in an XML format in accordance with the definition of ARIB STD-B38 as shown in FIG. 2. After the metadata producer 1 generates the metadata in an XML format as shown in FIG. 2, the metadata producer 1 provides a metadata producer signature 4A (in accordance with an XML-Signature) for the generated metadata as shown in FIG. 3.

In FIG. 3, a metadata producer public key certificate 5A of the producer is included in the metadata producer signature 4A. The metadata after signature becomes signed metadata 3A in an XML format. When the entire document or the product portions 13 of the producer 1 are to be signed, the signed XML document is embedded as a signature 4A of the producer in the metadata in a format according to XML-Signature Syntax and Processing. Further, a public key certificate of a signer is embedded as a public key certificate 5A of the signer in the signature 4A of the producer according to the standard of the XML-Signature for certificates.

In FIG. 4, the metadata 3A and the content 6A produced by a first producer 1 is transferred via the network 25 to a second producer (referred to as a metadata producer 34), who is a content provider.

When the second producer 34 receives the metadata as 3A' from the first producer 1, the second producer 34 adds product portions 37 of the metadata producer 34 to the metadata 3A' as shown in FIG. 5.

In FIG. 5, signature processing is conducted on portions generated by the metadata producer 34 after the addition, and a signature 39 of the metadata producer 34 is provided to the metadata. The signature 39 of the metadata producer 34 contains a metadata producer public key certificate, which is a public key certificate of the second producer 34. In this manner, the signature 39 of the metadata producer 34 is embedded in the metadata.

In FIG. 4, content 6A' (equivalent to 6A) and metadata 3A' produced by the metadata producer 34 are distributed via the network 10 and the broadcasting network 11 so that the metadata 3A' is distributed as metadata 3B to the metadata controlling device 8, which is a user's terminal, and that the content 6A' is distributed as the content 6B to the content receiving device 9. The user verifies the signature 4A of the metadata producer, which is a signature of the metadata producer 1, and the signature 39 of the metadata producer, which is a signature of the metadata producer 34 (FIG. 5), each of which has been added to the distributed metadata 3B, and confirms that the metadata 3B have not been falsified. Then, the user can generate a metadata addition in product portions of the user in the metadata 3B, as with the product portions 37 in FIG. 5, and can add his/her signature as with the signature 39 in FIG. 5 in the product portions of the user in the metadata 3B.

In this case, the user plays back a digest of the content 6B using the metadata 3B including his/her metadata addition. At that time, fragments of the content 6B to be played back are described in the metadata 3B between tags <SegmentInformation . . . > and </SegmentInformation> according to ARIB STD-B38. The content receiving device 9 is commanded to play back a digest of the content 6B according to the fragment information. Playback is performed after checking access control information to the content 6B from the metadata 3B, which is one of the most important features of the present invention. Acceptance or rejection of access to the content 6B from the metadata 3B is determined in the following procedures.

Procedure 1: A first signature (a signature 4A of the metadata producer 1), a second signature (a signature 39 of the metadata producer 34), and a third signature (a signature of a user using the metadata controlling device 8 and the content receiving device 9), which are included in the metadata 3B, are verified. Simultaneously, certificates required for the verification of the signatures are also verified.

Procedure 2: A person who has generated a portion in the metadata to be used is identified from a signature added in that portion. At that time, owner's name and owner's organization are specified from an owner of a public key certificate of a metadata producer that is contained in the first to third signatures (signature document in an XML signature format). Owner's attributes of a public key certificate are represented in a format called DN (Distinguished Name). Owner's name is registered in a value cn, and owner's organization is registered in a value ou. The same naming convention as the metadata access control identification of FIG. 10 is applied to the value cn, and the same naming convention as the metadata access control type of FIG. 10 is applied to the value ou.

Procedure 3: Meanwhile, access control information according to the two tables of FIG. 10, which was generated in the metadata access control information generating part 60 (FIG. 8) of the content generating device 22 at the time of generation of the content, is distributed as a metadata access control identifier 7A to the content receiving device (playback device) 9 together with the content 6A. The metadata controlling device 8 makes an inquiry to the content receiving device (playback device) 9 to obtain the metadata access control identifier 7A.

Procedure 4: At that time, in response to a request from the metadata controlling device 8, the content receiving device (playback device) 9 of FIG. 9 fetches metadata access control information 75 (metadata access control identifier 7A) from the metadata access control information storage unit 73 and returns it to the metadata controlling device 8.

Procedure 5: A metadata access control identification and a metadata access control type of the metadata access control descriptor 7A returned from the content receiving device (playback device) 9 are compared with owner attributes cn and ou of certificates of three producers who produced the metadata to be used. An access control is performed by determining whether the owner attributes cn and ou of the certificates of the three producers match the metadata access control identification and the metadata access control type of the metadata access control descriptor 7A.

If at least one of the owners of the certificates of the three producers is described in the metadata access control descriptor 7A, access to the content 6B is permitted from the information in the metadata 3B which was produced by the owner. When the access is permitted, the content receiving device (playback device) 9 is commanded to perform a partial playback of the content 6B or to display other information according to the information of the permitted metadata 3B. The content receiving device (playback device) 9 performs a partial playback of the content 6B according to the instructions.

As described above, the embodiment of the present invention has features in that, with regard to separately distributed metadata and contents in a format defined by ARIB STD-B38, propriety of access to content from metadata is controlled by comparing information of an owner of a public key certificate of a signer of the metadata with a metadata access control descriptor embedded in the content.

According to the embodiment of the present invention, it is possible to determine access propriety to content from metadata by comparing information of an owner of a public key certificate in a signature value of a metadata producer with a metadata access control descriptor embedded in the content.

Further, according to the embodiment of the present invention, a proper hierarchical structure is provided to information of an owner of a certificate, and a metadata access control descriptor corresponding to the hierarchical structure (the metadata access control descriptor 1 or 2 in FIG. 10) is defined. Therefore, it is possible to achieve an access control to content from metadata according to an organization attribute of a producer of the metadata.

In the above embodiment, as shown in FIG. 8, content and license information (Kc transmission ECM/EMM) including an identifier (metadata access control descriptor) are multiplexed and transmitted by the multiplexing means 63. However, the content and the license information are not necessarily required to be transmitted together. For example, license information (Kc transmission ECM/EMM) in which an identifier (metadata access control descriptor) is embedded may be transmitted after only content is transmitted.

The invention claimed is:

1. An access control method characterized by comprising:
a producer information embedding step of embedding identification information indicating a producer of metadata produced for content in the metadata, the metadata further comprising additional description of the content, said producer information embedding step further for embedding, when the metadata are additionally edited by a different producer, identification information indicating the different producer in the metadata;
a step of embedding, in the content as license information required to play back the content, identification information indicating a permitted producer of the metadata that is permitted access to the content and identification information indicating a permitted different producer of the metadata that is permitted to additionally edit the metadata; and
an access propriety control step of comparing the identification information of the metadata with the identification information of the content to control propriety of access to the content from the metadata by whether all of the identification information of the metadata are included in the identification information of the content, wherein the metadata further comprises a program description, a segment information table comprising a segment list and a segment group list, signedInfo comprising a signature method algorithm and a reference URL, a signature value, and keyInfo.

2. The access control method as recited in claim 1, characterized in that the identification information of the content comprises a metadata access control descriptor indicating the permitted producer of the metadata that is permitted to access to the content and a metadata access control descriptor indicating the permitted different producer of the metadata that is permitted to additionally edit the metadata.

3. The access control method as recited in claim 1, characterized in that said producer information embedding step comprises a digital signature embedding step of embedding a digital signature indicating the producer of the metadata as the identification information in the metadata said digital signature embedding step further for embedding, when the metadata are additionally edited by the different producer, a digital signature indicating the different producer as the identification information in the metadata, and
said access propriety control step comprises a step of comparing the digital signatures of the metadata with the identification information of the content to control the propriety of the access to the content from the metadata by whether all of the digital signatures of the metadata are included in the identification information of the content.

4. The access control method as recited in claim 3, characterized in that the identification information of the content comprises a metadata access control descriptor indicating the permitted producer of the metadata that is permitted access to the content and a metadata access control descriptor indicating the permitted different producer of the metadata that is permitted to additionally edit the metadata.

5. The access control method as recited in claim 3, characterized in that the digital signatures can specify signers as the producer and the different producer based on public key infrastructure (PKI) technology.

6. The access control method as recited in claim 3, characterized in that the identification information of the content comprises a metadata access control descriptor indicating the permitted producer of the metadata that is permitted access to the content and a metadata access control descriptor indicating the permitted different producer of the metadata that is permitted to additionally edit the metadata,
the digital signatures of the metadata include information on public key certificates of signers as the producer and the different producer, and
said access propriety control step comprises permitting access to the content from the metadata and allowing an image of the content to be viewed based on the metadata when the information on the public key certificates of the signers as the producer and the different producer is identified as the permitted producer and the permitted different producer indicated by the metadata access control descriptors.

7. An access control system comprising:
a processor including a metadata generating device generating metadata;
producer information embedding means for embedding identification information indicating a producer of metadata produced for content in the metadata, the metadata further comprising additional description of the content, said producer information embedding means further for embedding, when the metadata are additionally edited by a different producer, identification information indicating the different producer in the metadata;
identification information embedding means for embedding, in the content as license information required to play back the content, identification information indicating a permitted producer of the metadata that is permitted access to the content and identification information indicating a permitted different producer of the metadata that is permitted to additionally edit the metadata; and
access propriety control means for comparing the identification information of the metadata with the identification information of the content to control propriety of access to the content from the metadata by whether all of the identification information of the metadata are included in the identification information of the content, wherein the metadata further comprises a program description, a segment information table comprising a segment list and a segment group list, signedInfo comprising a signature method algorithm and a reference URL, a signature value, and keyInfo.

8. The access control system as recited in claim 7, characterized in that the identification information of the content comprises a metadata access control descriptor indicating the permitted producer of the metadata that is permitted access to the content and a metadata access control descriptor indicating the permitted different producer of the metadata that is permitted to additionally edit the metadata.

9. The access control system as recited in claim 7, characterized in that said producer information embedding means comprises digital signature embedding means for embedding a digital signature indicating the producer of the metadata as the identification information in the metadata, said digital signature embedding means further for embedding, when the metadata are additionally edited by the different producer, a digital signature indicating the different producer as the identification information in the metadata, and
said access propriety control means comprises means for comparing the digital signatures of the metadata with the identification information of the content to control the propriety of the access to the content from the metadata by whether all of the digital signatures of the metadata are included in the identification information of the content.

10. The access control system as recited in claim 9, characterized in that the identification information of the content comprises a metadata access control descriptor indicating the permitted producer of the metadata that is permitted access to the content and a metadata access control descriptor indicating the permitted different producer of the metadata that is permitted to additionally edit the metadata.

11. The access control system as recited in claim 9, characterized in that the digital signatures can specify signers as the producer and the different producer based on public key infrastructure (PKI) technology.

12. The access control system as recited in claim 9, characterized in that the identification information of the content comprises a metadata access control descriptor indicating the permitted producer of the metadata that is permitted access to the content and a metadata access control descriptor indicating the permitted different producer of the metadata that is permitted to additionally edit the metadata,
the digital signatures of the metadata include information on public key certificates of signers as the producer and the different producer, and
said access propriety control means permitting access to the content from the metadata and allowing an image of the content to be viewed based on the metadata when the information on the public key certificates of the signers as the producer and the different producer is identified as the permitted producer and the permitted different producer indicated by the metadata access control descriptors.

13. A metadata controlling device for use in combination with a content receiving part having a function of receiving and playing back content and a function of receiving identification information embedded in the content as license information required to play back the content, the identification information of the content comprising identification information indicating a permitted producer of metadata that is permitted access to the content and identification information indicating a permitted different producer of the metadata that is permitted to additionally edit the metadata, said metadata controlling device comprising:
means for receiving the metadata produced for the content, identification information indicating a producer of the metadata and embedded in the metadata, and identification information indicating a different producer and embedded, when the metadata are additionally edited by the different producer, in the metadata, the metadata further comprising additional description of the content; and
an access propriety controlling means for obtaining the identification information of the content from the content receiving part and comparing the identification information of the metadata with the identification information of the content to control propriety of access to the content in the content receiving part from the metadata by whether all of the identification information of the metadata are included in the identification information of the content, wherein the metadata further comprises a program description, a segment information table comprising a segment list and a segment group list, signedInfo comprising a signature method algorithm and a reference URL, a signature value, and keyInfo.

14. The metadata controlling device as recited in claim 13, characterized in that the identification information of the content comprises a metadata access control descriptor indicating the permitted producer of the metadata that is permitted access to the content and a metadata access control descriptor indicating the permitted different producer of the metadata that is permitted to additionally edit the metadata.

15. The metadata controlling device as recited in claim 13, characterized in that the identification information of the metadata comprises a digital signature indicating the producer of the metadata and a digital signature indicating the different producer.

16. The metadata controlling device as recited in claim 15, characterized in that the identification information of the content comprises a metadata access control descriptor indicating the permitted producer of the metadata that is permitted access to the content and a metadata access control descriptor indicating the permitted different producer of the metadata that is permitted to additionally edit the metadata.

17. The metadata controlling device as recited in claim 15, characterized in that the digital signatures can specify signers as the producer and the different producer based on public key infrastructure (PKI) technology.

18. The metadata controlling device as recited in claim 15, characterized in that the identification information of the content comprises a metadata access control descriptor indicating the permitted producer of the metadata that is permitted access to the content and a metadata access control descriptor indicating the permitted different producer of the metadata that is permitted to additionally edit the metadata,
the digital signatures of the metadata include information on public key certificates of signers as the producer and the different producer, and
said metadata controlling device is operable to permit access to the content in the content receiving part from the metadata and to allow an image of the content to be viewed based on the metadata when the information on the public key certificates of the signers as the producer and the different producer is identified as the permitted producer and the permitted different producer indicated by the metadata access control descriptors.

19. A transmitting apparatus comprising:
a metadata transmitting device for transmitting metadata produced for content to a receiving apparatus, said metadata transmitting device having a function of transmitting the metadata to the receiving apparatus in a state such that identification information indicating a producer of the metadata is embedded in the metadata, the metadata further comprising additional description of the content; and
a content transmitting device for transmitting the content to the receiving apparatus, said content transmitting device having a function of transmitting license information required to play back the content to the receiving apparatus in a state such that identification information indicating a permitted producer of the metadata that is permitted access to the content is embedded in the content as the license information and that identification information indicating a permitted different producer of the metadata that is permitted to additionally edit the metadata is embedded in the content as the license information,
wherein said transmitting apparatus is configured to allow the receiving apparatus to control propriety of access to the content from the produced metadata by comparing the identification information indicating the producer of the metadata received from said metadata transmitting device and identification information indicating a different producer and embedded in the metadata when the metadata are additionally edited in the receiving apparatus by the different producer with the identification information of the content received from said content transmitting device to judge whether all of the identification information of the metadata are included in the identification information of the content, wherein the metadata further comprises a program description, a segment information table comprising a segment list and a segment group list, signedInfo comprising a signature method algorithm and a reference URL, a signature value, and keyInfo.

20. The transmitting apparatus as recited in claim 19, characterized in that the identification information of the content comprises a metadata access control descriptor indicating the permitted producer of the metadata that is permitted access to the content and a metadata access control descriptor indicating the permitted different producer of the metadata that is permitted to additionally edit the metadata.

21. The transmitting apparatus as recited in claim 19, characterized in that the identification information indicating the producer of the metadata comprises a digital signature indicating the producer of the metadata and the identification information indicating the different producer comprises a digital signature indicating the different producer.

22. The transmitting apparatus as recited in claim 21, characterized in that the identification information of the content comprises a metadata access control descriptor indicating the permitted producer of the metadata that is permitted access to the content and a metadata access control descriptor indicating the permitted different producer of the metadata that is permitted to additionally edit the metadata.

23. The transmitting apparatus as recited in claim 21, characterized in that the digital signatures can specify signers as the producer and the different producer based on public key infrastructure (PKI) technology.

24. The transmitting apparatus as recited in claim 21, characterized in that the identification information of the content comprises a metadata access control descriptor indicating the permitted producer of the metadata that is permitted access to the content and a metadata access control descriptor indicating the permitted different producer of the metadata that is permitted to additionally edit the metadata,
the digital signatures of the metadata include information on public key certificates of signers as the producer and the different producer, and
said transmitting apparatus is operable to permit access to the content from the metadata in the receiving apparatus and to allow the receiving apparatus to view an image of the content based on the metadata when the information on the public key certificates of the signers as the producer and the different producer is identified as the permitted producer and the permitted different producer indicated by the metadata access control descriptors in the receiving apparatus.

* * * * *